US009196203B2

(12) United States Patent
Roth et al.

(10) Patent No.: US 9,196,203 B2
(45) Date of Patent: Nov. 24, 2015

(54) DEVICE AND SYSTEM FOR A MULTI-COLOR SEQUENTIAL LCD PANEL WHEREIN THE NUMBER OF COLORS IN A SEQUENCE OF DISPLAY COLORS IS GREATER THAN THE NUMBER OF LED COLORS

(71) Applicant: SAMSUNG DISPLAY CO., LTD., Yongin-si (KR)

(72) Inventors: Shmuel Roth, Petach Tikva (IL); Ilan Ben-David, Rosh Ha'ayin (IL); Moshe Ben-Chorin, Rehovot (IL)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/652,329

(22) Filed: Oct. 15, 2012

(65) Prior Publication Data

US 2013/0038812 A1 Feb. 14, 2013

Related U.S. Application Data

(60) Continuation of application No. 12/324,136, filed on Nov. 26, 2008, now Pat. No. 8,289,266, which is a continuation-in-part of application No. 12/103,269, filed on Apr. 15, 2008, now Pat. No. 8,885,120, which (Continued)

(51) Int. Cl.
*G02F 1/1335* (2006.01)
*G09G 3/36* (2006.01)

(Continued)

(52) U.S. Cl.
CPC ............ *G09G 3/3607* (2013.01); *G09G 3/3413* (2013.01); *G09G 3/2003* (2013.01);

(Continued)

(58) Field of Classification Search
CPC .......................................... G02F 2001/133622
USPC .......................................... 349/61-65, 68, 78
See application file for complete search history.

(56) References Cited

U.S. PATENT DOCUMENTS 3,699,244 A 10/1972 Cohen et al.
3,870,517 A 3/1975 Ota et al.

(Continued)

FOREIGN PATENT DOCUMENTS

EP 0367848 5/1990
EP 0547603 6/1993

(Continued)

OTHER PUBLICATIONS

U.S. Appl. No. 60/255,914, filed Dec. 18, 2000, Ben-David et al.

(Continued)

*Primary Examiner* — Paul Lee
(74) *Attorney, Agent, or Firm* — Pearl Cohen Zedek Latzer Baratz LLP

(57) ABSTRACT

A sequential color LCD device for displaying a color image using at least four different primary colors, with back illumination system comprising of at least three color LEDs. The device is capable of activating at least two color LEDs simultaneously, thus obtaining additional display colors. A method is disclosed for displaying more than three colors using an LCD device having three color LEDs, in which the LED back illumination system sequentially illuminates the LC array with only a first single LED color, a simultaneous operation of first and second LED colors, and then only the second LED color. The device may drive the LC cells from a first color data value directly to a subsequent color data value directly, without driving the LC cell to zero transmittance prior to loading of the subsequent color data value. The device may correct for color phase shift and for the dependency of apparent color intensity.

15 Claims, 9 Drawing Sheets

Related U.S. Application Data is a division of application No. 11/882,491, filed on Aug. 2, 2007, now Pat. No. 7,995,019, which is a continuation of application No. 10/480,280, filed as application No. PCT/IL02/00452 on Jun. 11, 2002, now Pat. No. 7,268,757.

(60) Provisional application No. 60/296,767, filed on Jun. 11, 2001, provisional application No. 60/996,562, filed on Nov. 26, 2007, provisional application No. 60/318,626, filed on Sep. 13, 2001, provisional application No. 60/371,419, filed on Apr. 11, 2002.

(51) Int. Cl.
*G09G 3/34* (2006.01)
*G09G 3/20* (2006.01)

(52) U.S. Cl.
CPC ....... *G09G 3/342* (2013.01); *G09G 2300/0452* (2013.01); *G09G 2310/0235* (2013.01); *G09G 2310/065* (2013.01); *G09G 2320/0242* (2013.01); *G09G 2320/0285* (2013.01)

(56) References Cited

U.S. PATENT DOCUMENTS 4,390,893 A 6/1983 Russell et al.
4,751,535 A 6/1988 Myers
4,800,375 A 1/1989 Silverstein et al.
4,843,381 A 6/1989 Baron
4,843,573 A 6/1989 Taylor et al.
4,892,391 A 1/1990 Stewart et al.
4,952,972 A 8/1990 Someya
4,953,953 A 9/1990 Fergason
4,985,853 A 1/1991 Taylor et al.
4,994,901 A 2/1991 Parulski et al.
5,042,921 A 8/1991 Sato et al.
5,087,610 A 2/1992 Hed
5,184,114 A 2/1993 Brown
5,191,450 A 3/1993 Yajima et al.
5,214,418 A 5/1993 Fukumura et al.
5,233,183 A 8/1993 Field
5,233,385 A 8/1993 Sampsell
5,243,414 A 9/1993 Dalrymple et al.
5,337,068 A 8/1994 Stewart et al.
5,375,002 A 12/1994 Kim et al.
5,416,890 A 5/1995 Beretta
5,447,811 A 9/1995 Buhr et al.
5,455,600 A 10/1995 Friedman et al.
5,563,621 A 10/1996 Silsby
5,592,188 A 1/1997 Doherty et al.
5,614,925 A 3/1997 Braudaway et al.
5,631,734 A 5/1997 Stern et al.
5,642,176 A 6/1997 Abukawa et al.
5,650,942 A 7/1997 Granger
5,657,036 A 8/1997 Markandey et al.
5,724,062 A 3/1998 Hunter
5,736,754 A 4/1998 Shi et al.
5,740,334 A 4/1998 Lin et al.
5,751,385 A 5/1998 Heinze
5,784,038 A 7/1998 Irwin
5,821,913 A 10/1998 Mamiya
5,835,099 A 11/1998 Marimont
5,841,492 A 11/1998 Iwauchi et al.
5,841,494 A 11/1998 Hall
5,844,540 A 12/1998 Terasaki
5,844,699 A 12/1998 Usami et al.
5,863,125 A 1/1999 Doany
5,870,530 A 2/1999 Balasubramanian
5,872,898 A 2/1999 Mahy
5,892,891 A 4/1999 Dalal et al.
5,909,227 A 6/1999 Silverbrook
5,936,617 A 8/1999 Uchino et al.
5,982,347 A 11/1999 Shigeta et al.
5,982,541 A 11/1999 Li et al.
5,999,153 A 12/1999 Lind et al.
6,018,237 A 1/2000 Havel
6,058,207 A 5/2000 Tuijn et al.
6,069,601 A 5/2000 Lind et al.
6,072,464 A 6/2000 Ozeki
6,097,367 A 8/2000 Kuriwaki et al.
6,100,861 A 8/2000 Cohen et al.
6,115,016 A 9/2000 Yoshihara et al.
6,144,420 A 11/2000 Jung
6,147,720 A 11/2000 Guerinot et al.
6,160,596 A 12/2000 Sylvester et al.
6,191,826 B1 2/2001 Murakami et al.
6,198,512 B1 3/2001 Harris
6,220,710 B1 4/2001 Raj et al.
6,224,216 B1 5/2001 Parker et al.
6,231,190 B1 5/2001 Dewald
6,236,390 B1 5/2001 Hitchcock
6,236,406 B1 5/2001 Li
6,239,783 B1 5/2001 Hill et al.
6,243,070 B1 6/2001 Hill et al.
6,246,396 B1 6/2001 Gibson et al.
6,256,073 B1 7/2001 Pettitt
6,259,430 B1 7/2001 Riddle et al.
6,262,710 B1 7/2001 Smith
6,262,744 B1 7/2001 Carrein
6,280,034 B1 8/2001 Brennesholtz
6,304,237 B1 10/2001 Karakawa
6,324,006 B1 11/2001 Morgan
1,017,546 A1 12/2001 Ben Chorin et al.
6,366,291 B1 4/2002 Taniguchi et al.
6,369,867 B1 * 4/2002 Ge ................................. 349/73
6,380,961 B1 4/2002 Van Der Loop et al.
6,384,839 B1 5/2002 Paul
6,388,648 B1 5/2002 Clifton et al.
6,407,766 B1 6/2002 Ramanujan et al.
6,456,301 B1 9/2002 Huang
6,459,425 B1 10/2002 Holub et al.
6,467,910 B1 10/2002 Sato
6,498,592 B1 12/2002 Matthies
6,538,742 B1 3/2003 Ohsawa et al.
6,570,584 B1 5/2003 Cok et al.
6,577,291 B2 6/2003 Hill et al.
6,580,482 B1 6/2003 Hiji et al.
6,594,387 B1 7/2003 Pettitt et al.
6,595,648 B1 7/2003 Woodgate et al.
6,633,302 B1 10/2003 Ohsawa et al.
6,687,414 B1 2/2004 Edgar
6,707,516 B1 3/2004 Johnson et al.
6,744,416 B2 6/2004 Mizutani et al.
6,750,992 B1 6/2004 Holub
6,833,888 B2 12/2004 Song et al.
6,870,523 B1 3/2005 Ben-David et al.
6,882,384 B1 4/2005 Sharp
6,897,876 B2 5/2005 Murdoch et al.
6,952,194 B1 10/2005 Yamazaki et al.
6,972,736 B1 12/2005 Wada et al.
7,113,152 B2 9/2006 Ben-David et al.
7,129,955 B2 10/2006 Motomura
7,136,083 B2 11/2006 Tezuka et al.
7,206,005 B2 4/2007 Yamashita et al.
7,268,757 B2 9/2007 Ben-David et al.
7,352,488 B2 4/2008 Ben-Chorin et al.
7,492,379 B2 2/2009 Credelle et al.
7,990,403 B2 8/2011 Ben-David et al.
7,995,019 B2 8/2011 Ben-David et al.
8,248,440 B2 8/2012 Ben-David et al.
2001/0035922 A1 11/2001 Park et al.
2002/0005829 A1 1/2002 Ouchi
2002/0015046 A1 2/2002 Okada et al.
2002/0024618 A1 2/2002 Imai
2002/0051111 A1 5/2002 Greene et al.
2002/0054424 A1 5/2002 Miles
2002/0060662 A1 * 5/2002 Hong ........................... 345/102
2002/0060689 A1 5/2002 Iwata et al.
2002/0061369 A1 5/2002 Kunimatsu et al.
2002/0097365 A1 7/2002 Yang et al.
2002/0122019 A1 9/2002 Baba et al.
2002/0149546 A1 10/2002 Ben-Chorin et al.

(56) References Cited

U.S. PATENT DOCUMENTS

| | | | |
|---|---|---|---|
| 2002/0163526 A1 | 11/2002 | Haseltine et al. |
| 2002/0167528 A1 | 11/2002 | Edje |
| 2002/0186229 A1 | 12/2002 | Brown Elliott |
| 2002/0191130 A1 | 12/2002 | Liang et al. |
| 2003/0085906 A1 | 5/2003 | Elliott et al. |
| 2003/0146891 A1 | 8/2003 | Poliakine |
| 2004/0177323 A1 | 9/2004 | Kaasila et al. |
| 2007/0001994 A1 | 1/2007 | Roth |
| 2008/0024410 A1 | 1/2008 | Ben-David et al. |
| 2008/0030447 A1 | 2/2008 | Ben-David et al. |
| 2008/0192178 A1 | 8/2008 | Ben-David et al. |
| 2011/0285613 A1 | 11/2011 | Ben-David et al. |

FOREIGN PATENT DOCUMENTS

| | | |
|---|---|---|
| EP | 0653879 | 5/1995 |
| EP | 1087341 | 3/2001 |
| GB | 2 139 393 | 11/1984 |
| JP | 59-159131 | 9/1984 |
| JP | 60263122 | 12/1985 |
| JP | 62-222774 | 9/1987 |
| JP | 02-173783 | 7/1990 |
| JP | 03-043698 | 4/1991 |
| JP | 3-092888 | 4/1991 |
| JP | 07043658 | 2/1995 |
| JP | 8-248410 | 9/1996 |
| JP | 08-280038 | 10/1996 |
| JP | 09-230301 | 9/1997 |
| JP | 9-251160 | 9/1997 |
| JP | H10 91083 | 4/1998 |
| JP | 10307205 | 11/1998 |
| JP | 11-052327 | 2/1999 |
| JP | 2000-116789 | 4/2000 |
| JP | 2000-171799 | 6/2000 |
| JP | 2000-253263 | 9/2000 |
| JP | 2000-321993 | 11/2000 |
| JP | 2000-338950 | 12/2000 |
| JP | 2000-347324 | 12/2000 |
| JP | 2001-209047 | 8/2001 |
| JP | 2001-248410 | 9/2001 |
| JP | 2001-306023 | 11/2001 |
| JP | 2002-091369 | 3/2002 |
| JP | 2002-318564 | 10/2002 |
| WO | WO 95/10160 | 4/1995 |
| WO | WO 97/35424 | 9/1997 |
| WO | WO 97/40621 | 10/1997 |
| WO | WO 97/42770 | 11/1997 |
| WO | WO 01/95544 | 12/2001 |
| WO | WO 02/11112 | 2/2002 |
| WO | WO 02/50763 | 6/2002 |
| WO | WO 02/091299 | 11/2002 |
| WO | WO 02/091348 | 11/2002 |
| WO | WO 02/091349 | 11/2002 |
| WO | WO 02/099557 | 12/2002 |
| WO | WO 02/101644 | 12/2002 |
| WO | WO 03/058587 | 7/2003 |

OTHER PUBLICATIONS

U.S. Appl. No. 09/710,895, filed Nov. 14, 2000, Ben David et al.

Ken-ichi Takatori et al., "Field-Sequential Semectic LCD with TFT Pixel Amplifier", Functional Devices Research Labs, NEC Corp., Kawasaki, Kagawa 216-8555, Japan, SID01 Digest.

Chinese Office Action for Application No. 02815277.8 dated Oct. 27, 2006.

European Search Report for Application No. 02733203 dated Sep. 26, 2005.

European Office Action for Application No. 02733203 dated Oct. 17, 2006.

European Office Action for Application No. 04011262.5 dated Oct. 17, 2006.

European Search Report for Application No. 04011262.5 dated Oct. 25, 2005.

Japanese Office Action for Application No. 2003-504324 dated Mar. 22, 2007.

Supplementary European Search Report for Application No. 03706857 dated Sep. 20, 2006.

International Search Report for Application No. PCT/IL03/00307 mailed on Sep. 11, 2003.

Japanese Office Action for Application No. 2003-585062 dated Jan. 9, 2009.

International Search Report for Application No. PCT/IL03/00020 dated Jul. 2, 2003.

Keith Jack, "Video Demystified", 3rd Edition, LLH Technology Publishing, 2001, pp. 215-219.

Yamada et al., "12.1: LED Backlight for LCDs", IBM Research, Tokyo Research Laboratory, Yamato, Japan, 1998, SID, pp. 1-4.

"Parameter Values for the HDTV standards for Production and International Programme Exchange", Rec. ITU-R BT. 709-3, (1990-1994-1995-1998), pp. 1-28.

Betrisey et al., "20.4: Displaced Filtering for Patterned Didplays", Microsoft Corporation, Society for Information Display, 2000, SID, pp. 1-4.

Daly, Scott, "47.3: Analysis of Subtriad Addressing Algorithms by Visual System Models", Center for Displayed Appearance, Sharp Laboratories of America, Camas, WA, USA, 2001, SID, pp. 1200-1203.

Klompenhouwer et al., "13.4: Subpixel Image Scaling for Color Matrix Displays", Phillips Research Laboratories, Einhoven, The Netherlands, 2002, SID, pp. 176-179.

Credelle et al., "9-2: MTF of High-Resolution Pen Tile Matrix Displays", Eurodisplay 2002, pp. 159-162.

Platt, J., "Optimal Filtering for Patterned Displays", Microsoft Research, pp. 1-4.

Hiyama et al., "LN-3: Four-Primary Color 15-in. XGA TFT-LCD with Wide Color Gamut", Japan, Eurodisplay 2002, pp. 827-830.

Saugiura et al., "P-24: LCD Module Adopting a Color Conversion Circuit", Japan, SID, 2002, pp. 288-291.

Mashairo Yamaguchi et al., "Color image reproduction based on the multispectral and multiprimary imaging: Experimental evolution", Device Independent Color, Color Hardcopy and application VII, Proc. SPIE, vol. 4663, pp. 15-26 (2002).

"A Critical view of Spectral Models Applied to Binary Color Printing", Wyble and Berns, Color Research and Application, vol. 25, 2000, pp. 4-19.

Jeffrey A. Shimizu, "Scrolling Color LCOS for HDTV Rear Projection", SID 01 Digest, pp. 1072-1075.

Imai, "Spectral Reproduction from Scene to Hardcopy: Multi-spectral Acquisition and Spectral Estimation using a Trichromatic Digital Camera System Associated with Absorption Filters", Part I, MCSL Technical Report, Oct. 2000, pp. 1-20.

Rosen et al., "Spectral Reproduction from scene to Hardcopy II", Image Processing. Munsell Color Science Laboratory, RIT-Proceedings of SPIE, vol. 4300 (2001).

Pointer, M.R., "The Gamut of Real Surface Colors", Color Research & Appl. 5(3):145-155, 1980.

Ajito et al., "Expanded Color Gamut Reproduced by six-primary projection Display", Proc. SPIE, vol. 2954 (2000), pp. 130-37.

Ajito et al., "Color Conversion Method for Multiprimary Display Using Matrix Switching", Optical Review, vol. 9, No. 3 (Dec. 2001), 191-197.

Ajito et al., "Multiprimary Color Display for Liquid Crystal Display Projectors Using Diffraction Granting", Optical Eng. 38(11) 1883-1888 (Nov. 1999).

Gunter Wyszecki and W.S. Stiles, Color Science: Concepts and methods, Quantative Data and Formulae, 2d Ed., 1982, pp. 179-183.

Elliott, et al., "13.3 Co-Optimization of Color AMLCD Subpixel Architecture and Rendering Algorithms," SID Symp. Digest, May 2002, pp. 172-175.

Elliott, "Active Matrix Display Layout Optimization for Sub-pixel Image Rendering," Sep. 2000, Proceedings of the 1st International Display Manufacturing Conference, pp. 185-189.

Sugiura, T., "11.4: Invited Paper: EBU Color Filter for LCDs", Toppan Printing Co., Japan, SID, 2001, pp. 146-149.

Supplementary European Search Report for Application No. 03715317 dated Jan. 29, 2009.

(56) References Cited

OTHER PUBLICATIONS

International Search Report for Application No. PCT/IL02/00452 dated Dec. 9, 2002.
Office Action for U.S. Appl. No. 11/882,170 dated Aug. 3, 2010.
Office Action for U.S. Appl. No. 12/103,269 dated Jul. 17, 2009.
Office Action for U.S. Appl. No. 12/103,269 dated Jan. 6, 2010.
Final Office Action for U.S. Appl. No. 12/103,269 dated Jul. 15, 2010.
Office Action for U.S. Appl. No. 13/194,510 dated Dec. 23, 2011.
Chinese Office Action for Application No. ZL02815277.8 dated Nov. 27, 2006.
Chinese Office Action for Application No. ZL02815277.8 dated Nov. 9, 2007.
Chinese Office Action for Application No. ZL02815277.8 dated Aug. 3, 2007.
European Office Action for Application No. 02733203.0 dated Apr. 5, 2006.
Japanese Office Action for Application No. 2003-504324 dated May 19, 2006.
Japanese Office Action for Application No. 2008-112429 dated May 31, 2011.
Horibe et al., "High Efficiency and High Visual Quality LCD Backlighting System", SID Symposium Digest of Technical Papers, May 1998, vol. 29, Issue 1, pp. 153-156.
Office Action issued by the United States Patent and Trademark Office for U.S. Appl. No. 12/324,136 dated Sep. 12, 2011.
Notice of Allowance issued by the United States Patent and Trademark Office for U.S. Appl. No. 12/324,136 dated Jan. 26, 2012.
Notice of Allowance issued by the United States Patent and Trademark Office for U.S. Appl. No. 12/324,136 dated Jun. 1, 2012.
Corrected Notice of Allowance issued by the United States Patent and Trademark Office for U.S. Appl. No. 12/324,136 dated Jun. 18, 2012.
Notice of Allowance issued by the United States Patent and Trademark Office for U.S. Appl. No. 12/103,269 mailed Jul. 8, 2014.

* cited by examiner a.

b.

DEVICE AND SYSTEM FOR A MULTI-COLOR SEQUENTIAL LCD PANEL WHEREIN THE NUMBER OF COLORS IN A SEQUENCE OF DISPLAY COLORS IS GREATER THAN THE NUMBER OF LED COLORS

CROSS-REFERENCE TO RELATED APPLICATION

This application is a continuation application of U.S. patent application Ser. No. 12/324,136, filed Nov. 26, 2008, which claims priority from U.S. Provisional Application No. 60/996,562, filed on Nov. 26, 2007 and entitled Multiprimary Sequential LCD Panel, the entire disclosure of which is incorporated herein by reference. U.S. patent application Ser. No. 12/324,136 is a continuation-in-part application of U.S. patent application Ser. No. 12/103,269, filed Apr.15, 2008, which is a divisional application of U.S. patent application Ser. No. 11/882,491, filed Aug. 2, 2007, now U.S. Pat. No. 7,995,019, which is a continuation application of U.S. patent application Ser. No. 10/480,280, filed Dec. 11, 2003, now U.S. Pat. No. 7,268,757, which is a National Phase Application of PCT International Application No. PCT/IL02/00452, International Filing Date Jun. 11, 2002, claiming priority of U.S. Provisional Patent Application, 60/296,767, filed Jun. 11, 2001, U.S. Provisional Patent Application, 60/318,626, filed Sep. 13, 2001, and U.S. Provisional Patent Application, 60/371,419, filed Apr. 11, 2002. All of the above-mentioned applications are incorporated herein by reference in their entirety.

FIELD OF THE INVENTION

The invention relates generally to color liquid crystal display (LCD) devices and, more particularly, to LCD devices using three or more different color LEDs.

BACKGROUND OF THE INVENTION

There are many known types of RGB monitors, using various display technologies, including but not limited to cathode ray tubes (CRT), light emitting displays (LED), plasma, projection displays, liquid crystal display (LCD) devices and others. Over the past few years, the use of color LCD devices has been increasing steadily. A typical color LCD device may include a light source, an array of liquid crystal (LC) elements (cells), for example, an LC array using Thin Film Transistor (TFT) active-matrix technology, as is known in the art. The device may further include electronic circuits for driving the LC array cells, e.g., by active-matrix addressing, as is known in the art, and a tri-color filter array, e.g., a RGB filter array, registered and juxtaposed on the LC array. In existing LCD devices, each full-color pixel of the displayed image is reproduced by three sub-pixels, each sub-pixel corresponding to a different color, e.g., each pixel is reproduced by driving a respective set of R, G, and B sub-pixels. For each sub-pixel there is a corresponding cell in the LC array. Back-illumination source provides the light needed to produce the color images. The transmittance of each of the sub-pixels is controlled by the voltage applied to the corresponding LC cell, based on the RGB data input for the corresponding pixel. A controller receives the input RGB data, and adjusts the magnitude of the signal delivered to the different drivers based on the input data for each pixel. The intensity of white light provided by the back-illumination source is spatially modulated by the LC array, selectively attenuating the light for each sub-pixel according to the desired intensity of the sub-pixel. The selectively attenuated light passes through the RGB color filter array, wherein each LC cell is in registry with a corresponding color sub-pixel, producing the desired color sub-pixel combinations. The human vision system spatially integrates the light filtered through the different color sub-pixels to perceive a single integrated color image.

LCDs are used in various applications. LCDs are particularly common in portable devices, for example, the small size displays of personal digital assistant (PDA) devices, game consoles, and mobile telephones, and the medium size displays of laptop ("notebook") computers. These applications require thin and miniaturized designs and low power consumption. LCD technology is also used in non-portable devices, generally requiring larger display sizes, for example, desktop computer displays and TV sets. Different LCD applications may require different LCD designs to achieve optimal results. The more "traditional" markets for LCD devices, e.g., the markets of battery-operated devices (e.g., PDA, cellular phones, and laptop computers) require LCDs with high brightness efficiency, which leads to reduced power consumption. In desktop computer displays, high resolution, image quality and color richness are the primary considerations, and low power consumption is only a secondary consideration. Laptop computer displays require both high resolution and low power consumption; however, picture quality and color richness are compromised in many such devices. In TV display applications, picture quality and color richness are generally the most important considerations; power consumption and high resolution are secondary considerations in such devices.

A color sequential display may create a color image by dividing the color data to fields of the colors of the display and presenting these fields sequentially in time. For example, in RGB display the color data may be divided to red data, green data, and blue data, which may be displayed individually in sequence and repeated rapidly. Color sequential displays may be activated at a sufficiently high frequency to enable a viewer to temporally integrate the sequence of primary images into a full color image. Additionally, to produce a video image, the color sequential displays may be activated at a sufficiently high rate to enable reproduction of the required number of frames per second.

A sequential color LCD device may include a light source for back-illumination and an array of liquid crystal (LC) elements (cells). For example, the LC cells may be implemented using Thin Film Transistor (TFT) active-matrix technology, as is known in the art. The device further includes electronic circuits for driving the LC array cells, e.g., by active-matrix addressing, as is known in the art. The back-illumination of an RGB display may include three types of LEDs, red, green and blue, each of which color LEDs may be operated separately in a sequential manner. The transmittance of each LC cell may be controlled by the voltage applied to the LC cell and may be synchronized with the back illumination color LEDs. The color data for controlling the transmittance of each LC cell of each pixel may include, for example, the intensity of each of the colors.

U.S. Pat. No. 7,268,757 (the "'757 Patent"), the disclosure of which is incorporated herein by reference in its entirety, discloses a color LCD device for displaying a color image using at least four different colors, the device including an array of LC elements, driving circuitry adapted to receive an input corresponding to the color image and to selectively activate the LC elements of the LC array to produce an attenuation pattern corresponding to a gray-level representation of the color image, and an array of color sub-pixel filter elements juxtaposed and in registry with the array of LC elements such that each color sub-pixel filter element is in registry with one of the LC elements, wherein the array of color sub-pixel filter elements comprises at least four types of color sub-pixel filter elements, which transmit light of the at least four colors, respectively.

The '757 Patent also describes a sequential color LCD device using more than three colors. In such devices, color images may be produced by sequentially back-illuminating an array of Liquid Crystal (LC) cells with light of four or more, pre-selected, colors, producing a periodic sequence of four or more, respective, color images, which are temporally integrated into a full color image by a viewer's vision system. In some embodiments, sequential back-illumination with four or more colors is produced by sequentially filtering light through four or more, respective, color filters. In other embodiments, a multi-color light source, for example, a plurality of light emitting diodes (LEDs) capable of separately producing any of the four or more colors, activated individually by color to sequentially produce the different color back-illumination. The '757 Patent also describes a sequential LCD display of more than three colors using only red, green, and blue LEDs and operating LEDs of different colors simultaneously during the parts of the temporal sequence.

U.S. Pat. No. 5,724,062 (the "'062 Patent") discloses a color display having a liquid crystal pixel selectably addressable during a predetermined time period, a set of at least one red, one green, and one blue color light emitting diodes positioned adjacent the liquid crystal pixel for emitting light through the liquid crystal pixel, and means connected to the liquid crystal pixel for addressing the liquid crystal pixel a plurality of times during the predetermined time period for each color so as to provide persistence when changes in color are perceived by the human eye.

SUMMARY OF THE INVENTION

According to embodiments of the invention, a liquid crystal display (LCD) device may comprise a controller operably connected to driving circuitry for a plurality of liquid crystal (LC) cells and further operably connected to an illumination control system for an array of light emitting diodes (LEDs) arranged behind said LC array and in alignment therewith, said array comprising at least three different LED colors, said controller to receive input image data, and based thereon to produce a plurality of color display frames, each said color display frame comprising color selection data for each of a plurality of display colors and color transmittance data corresponding to each said display color, sequentially send the color transmittance data for said color display frames to said driving circuitry for controlling transmittance of said LC cells, and sequentially send in synchronization with said color transmittance data said color selection data for said color display frames to said illumination control system for selectively activating said array of LEDs, wherein for at least three of the display colors, the respective color selection data represents selective illumination of LEDs of a single color, and for at least one of the display colors, said color selection data represents selective illumination of LEDs of a plurality of colors, thereby sequentially producing color display frames representing more display colors than the number of LED colors.

According to embodiments of the invention, a sequential LCD system may comprise the hereabove controller, the driving circuitry connected to said controller and operably connected to drive the plurality of liquid crystal (LC) cells, and the illumination control system connected to said controller and operably connected to selectively activate the array of light emitting diodes (LEDs). A system may further include the array of LC cells. and the array of LEDs.

According to embodiments of the invention, a method for controlling a Liquid Crystal Display (LCD) device may comprise receiving input image data; based on said input image data, producing a plurality of color display frames, each said color display frame comprising color selection data for each of a plurality of display colors and color transmittance data corresponding to each said display color; sequentially driving an array of LC cells based on color transmittance data, said sequence corresponding to said plurality of display colors; sequentially activating in synchronization with said driving of the array of LC cells said array of LEDs, wherein for at least three of the display colors, the respective color selection data represents selective illumination of LEDs of a single color, and for at least one of the display colors, said color selection data represents selective illumination of LEDs of a plurality of colors, thereby sequentially producing color display frames representing more display colors than the number of LED colors.

BRIEF DESCRIPTION OF THE DRAWINGS

The invention will be understood and appreciated more fully from the following detailed description of embodiments of the invention, taken in conjunction with the accompanying drawings in which.

Figure 1:
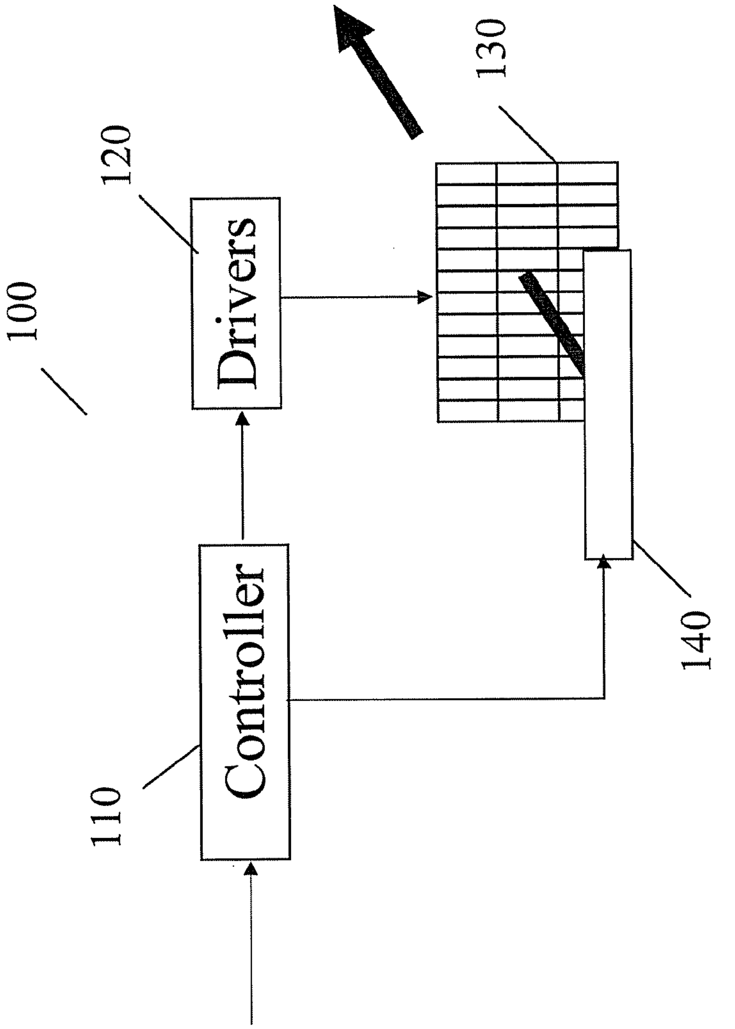
FIG. 1 is a schematic illustration of a sequential color LCD device according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the invention are described, with reference to specific embodiments that provide a thorough understanding of the invention; however, it will be apparent to one skilled in the art that the present invention is not limited to the specific embodiments and examples described herein. Further, to the extent that certain details of the devices, systems and methods described herein are related to known aspects of color display devices, systems and methods, such details may have been omitted or simplified for clarity.

Color integration by the human vision system can be performed temporally using sequential display devices, systems and methods, for example, sequential color LCD devices, using more than three colors. This concept is described in detail, in the context of sequential n-color image projection devices, in Applicants' U.S. Pat. No. 7,113,152, issued Sep. 26, 2006, entitled "Device, System and Method For Electronic True Color Display", the entire disclosure of which is incorporated herein by reference. In sequential projection color displays devices, four or more different color fields are projected sequentially, each for a short time period, and the process is repeated periodically at a sufficiently high frequency, whereby the human vision system temporally integrates the different color fields into a full color image.

An advantage of LCD devices based on sequential color representation, in accordance with embodiments of the present invention, is that such devices can display more-than-three-color images at a resolution comparable to the resolution at which the same devices can display three-color, e.g., RGB, images. Sequential LCD display devices do not require a color sub-pixel filter matrix in registry with the LC array. Instead, each LC element controls the intensity of all the colors for a given pixel, each color being controlled during designated time slots, whereby the LC array is utilized to its full resolution. According to embodiments of the invention, color combinations may be created by sequentially back-illuminating the LC array with different colors, both individually, and in combination with other colors. In contrast to projection devices, which typically require significant physical space to contain the projection optics, namely, the optical setup that projects a miniature spatial light modulator onto a screen, the sequential LCD device of the present invention does not require projection optics and may, thus, be implemented in flat configurations.

The architecture of a flat n-color display according to an embodiment of the present invention includes an LC array (panel) having a desired size and resolution. Such LCD panels are used, for example, in portable computers as are known in the art. However, in the sequential LCD devices of the present invention, the LC panel may be used without an adjacent array of color sub-pixel filters, whereby the LC array may operate as a monochromatic gray level device with respect to each display color, and the display colors are obtained by operation of the appropriate one or more LEDs. The cells of the LC array are selectively attenuated to produce a series of more-than-three gray-level patters, each pattern corresponding to one of more-than-three color components of the displayed image. The more-than-three color components may be produced by illuminating each of the three colors red, green, and blue, as well as at least one simultaneous combination thereof. Each gray-level pattern is back-illuminated with light of the corresponding display color, where display color may refer to a single LED color or a combination of two or more LED colors illuminated simultaneously. Switching among the different back-illuminations colors is synchronized with the sequence of gray-level patterns produced by the LC array, whereby each gray level pattern in the sequence is back-illuminated with light of the selected display color, i.e., one or a combination of LED colors. The back-illumination color sequence is repeated at a sufficiently high frequency, synchronized with the periodic sequence of patters produced by the LC array, whereby the viewer perceives a full color image by temporal integration as described above.

Reference is now made to FIG. 1, which is a schematic illustration of exemplary LCD device 100 according to some embodiments of the invention. Such LCDs are used, for example, in portable computers, handsets etc. as are known in the art. The architecture of a flat multi-color display according to an embodiment of the present invention includes an LC array 130 having a desired size and resolution. The cells of the LC array 130 may be selectively attenuated to produce a series of more-than-three color patterns, each pattern corresponding to one of more-than-three color components of the displayed image. Each attenuation pattern may be back-illuminated with light of the corresponding color. Switching among the different back-illuminations colors may be synchronized with the sequence of attenuation patterns produced by the LC array, whereby each attenuation pattern in the sequence may be illuminated with light of the correct color. The back-illumination color sequence may be repeated at a sufficiently high frequency, synchronized with the periodic sequence of patterns produced by the LC array, whereby the viewer perceives a full color image by temporal integration. The back-illumination may be generated by an array of Light Emitting Diodes (LEDs) 140, each LED capable of selectively producing light at one of at least three different wavelength ranges. The different color LED emissions may be activated sequentially, and the color sequence may be synchronized with the sequence of attenuation patterns produced by the LC array.

According to embodiments of the invention, the red, green and blue LEDs may have narrow spectra. For example, the peak of the emission distribution of such devices may typically be in the range of 630-680 nm for the red emission, 500-540 nm for the green emission, and 400-480 nm for the blue emission. Other or additional color LEDs may be used. The device may further include electronic circuits for driving the LC array cells 120, e.g., by active-matrix addressing, as is known in the art. The transmittance of each of the sub-pixels may be controlled by the voltage applied to the corresponding LC cell, based on the color data input for the corresponding pixel. A controller 110 may receive the input color data, scale it to the required size and resolution of the display, and adjust the magnitude of the signal delivered to the different drivers based on the input data for each color of each pixel, e.g., the transmittance data for each LC cell to control the display intensity of each LC cell, and the color illumination data for the LED back-lighting to control which color or colors are illuminated.

The controller may include or be in communication with a formatter, which arranges the incoming input stream of RGB pixels into color field data. Each of the input data is composed of three data values, usually corresponding to red, green and blue intensities on a specific position on the display. Each color field data corresponds to all data points across all the display for the same color. The formatter may include a memory or other structure to which the data is streamed one pixel after the other and from which the data can be read according to the appropriate field order, for example, by all data relating to a selected display color. In certain cases, only parts of the fields may need to be stored. Thus, the LC transmittance data sent to the LC cell array may be synchronized with the color selection data sent to the LED back-illumination to produce a high-resolution color image by sequential display of color frames, each frame produce by illuminating each of the three LED colors individually. In the case of a display having more than three LED colors, input RGB data may be converted into the relevant more-than-three LED colors, for example, as described in U.S. Pat. No. 7,113,152, and the data for the more-than-three LED colors may then be converted into pixel data formatted to color field data, which may include at least one display color using combination of the more-than-three LED colors. The LC transmittance data sent to the LC cell array may be synchronized with the color selection data sent to the LED back-illumination to produce a high-resolution color image by sequential display of color frames, each frame produce by illuminating each of the three LED colors individually and in combinations.

The sequential LCD device in accordance with embodiments of the invention may be activated at a sufficiently high frequency to enable a viewer to temporally integrate the sequence of n-color images, e.g., n display colors using 3 LED colors, where n>3, into a full color image. Additionally, to produce a video image, the sequential LCD device in accordance with embodiments of the invention may be activated at a sufficiently high rate to enable reproduction of the required number of frames per second A sequential color LCD device that operates at a sufficiently fast rate, using back-illumination of three colors, namely, red, green, and blue light, is described in Ken-ichi Takatori, Hiroshi Imai, Rideki Asada and Masao Imai, "Field-Sequential Smectic LCD with TFT Pixel Amplifier", Functional Devices Research Labs, NEC Corp., Kawasaki, Kagawa 216-8555, Japan, SID 01 Digest, the contents of which are incorporated herein by reference. In an embodiment of the present invention, a version of this three-color device is adapted to produce images using n display colors, where n is greater than three.

Figure 2:
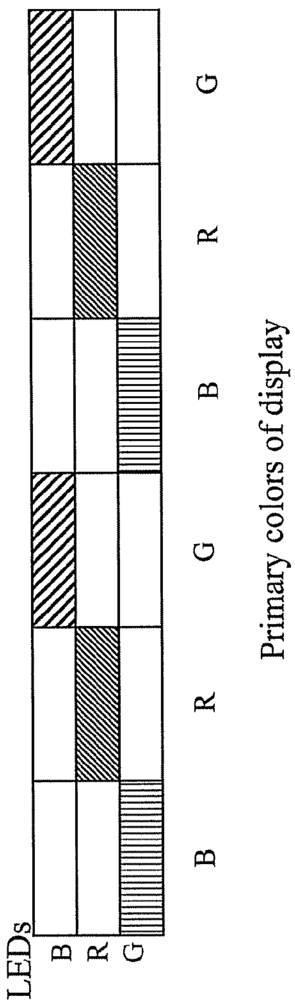
FIG. 2 is a schematic illustration of a sequential operation of red, green and blue LEDs according to some embodiments of the present invention.

Reference is now made to FIG. 2 which is a schematic illustration of a simple sequential operation of red, green, and blue LEDs. In the schematic diagram, each row represents one of the LED colors, where a shaded region represents a time when the color is operated. The colors indicated along the horizontal time axis represent the resulting color. The red, green and blue LEDs may be operated sequentially and repetitively. For purposes of illustration, the blue color is represented in the drawings by a wide downward diagonal pattern, the red color by a dark upward diagonal pattern and the green color by a light vertical pattern. In the example of FIG. 2, the simple operation of one color at a time is displayed, producing a rapid sequence of green, red, and blue LED colors by sequential repetition. When the repetition frequency is fast enough, the sequentially presented fields of the different colors may integrate in a viewer's mind and/or be seen by a viewer as colors created by combination of these colors.

According to some exemplary embodiments of the invention, two or more LED colors may be operated simultaneously, thereby obtaining mixed colors in addition to the LED colors. For example, simultaneous operation of red and green LEDs together may create a yellow display color, simultaneous operation of red and blue LEDs together may create a magenta display color, and simultaneous operation of green and blue LEDs together may create a cyan display color. Red, green, and blue may be operated simultaneously creating a full RGB emission component, for example, white.

Figure 3:
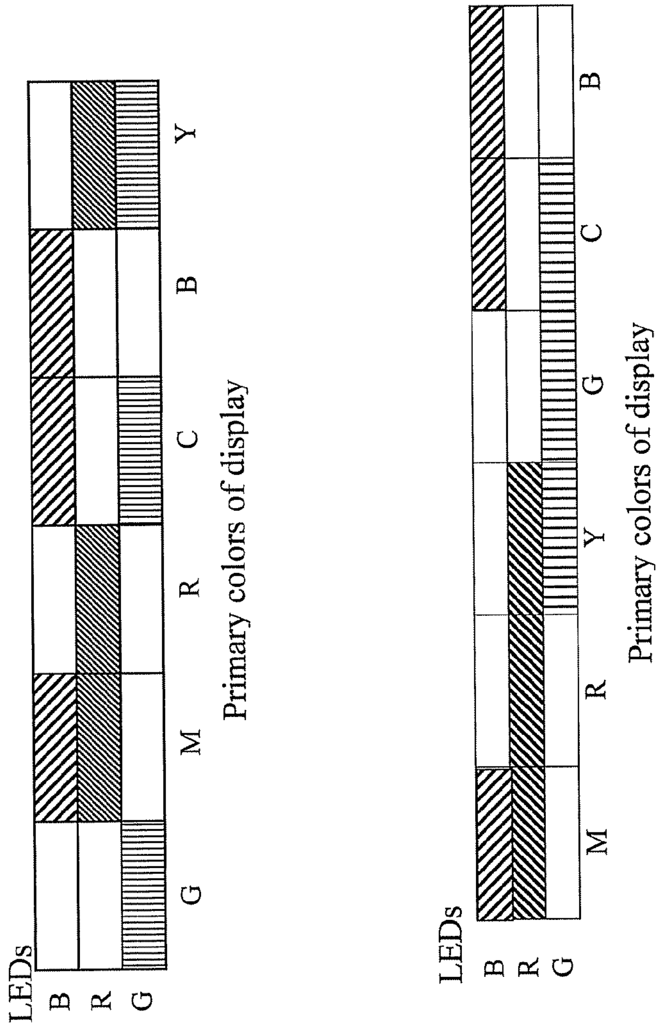
FIGS. 3A and 3B are exemplary schematic illustrations of operation of red, green and blue LEDs in different combinations in order to obtain six colors according to some embodiments of the present invention.

FIG. 3*a* is an exemplary schematic illustration of operation of red, green and blue LEDs in different combinations in order to obtain six colors, e.g., green, magenta, red, cyan, blue and yellow, according to some embodiments of the present invention. It will be recognized, as described further below, that not every combination of colors need be used in embodiments of the invention. In certain embodiments of the invention, it may be beneficial to arrange the timed order of operation of the color LEDs as depicted in FIG. 3*b* so that every LED color may illuminate continuously for substantially 50% of the frame duration, thereby reducing the number of switching operations for each LED color. In the multi-color display of FIGS. 3*a* and 3*b*, the total operation time of each of the LEDs may be substantially 50% of the frame duration, wherein in the RGB display of FIG. 2, the operation time of each of the LEDs may be substantially only 33% of the frame duration. Therefore, for example, when combining the LEDs as illustrated in FIG. 3*a* or 3*b*, the LEDs may be operated with a lower peak power while providing the same average intensity as FIG. 2, thereby increasing efficiency of the LEDs.

Figure 4:
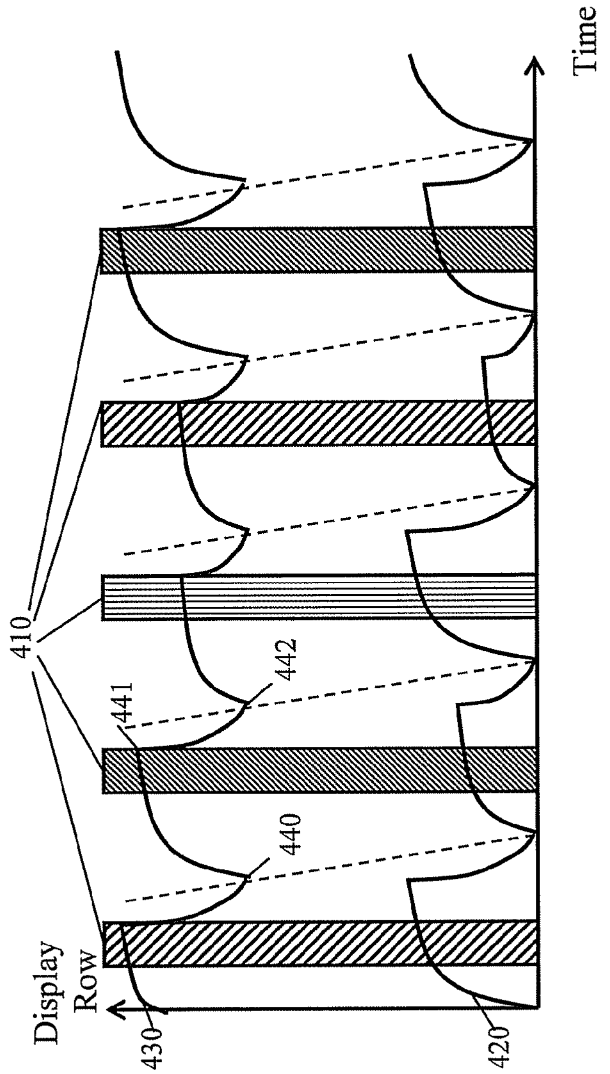
FIG. 4 is a schematic illustration of operation of a sequential RGB display according to some embodiments of the present invention.

Reference is now made to FIG. 4, which is a schematic illustration of operation of a sequential RGB display according to embodiments of the invention. The continuous undulating lines 420, 430 represent the loading patterns of the color data onto the LC cell over time. Points 440, 441 and 442 represent points in time along a data loading cycle of a single color, e.g., red. At the beginning of the color data loading cycle the LC cell may be at the closed opaque condition 440. After the color data is loaded onto the LC cell, the transmittance of the cell increases towards the target transmittance 441 and the LC cell is in the open condition. The back illumination color LED operation, represented in FIG. 4 as the perpendicular rectangles 410, may be synchronized with the color data loading cycle and activated substantially during the open state of the LC cell. In a typical sequential RGB display, the LC cell may be driven back to the opaque condition 442 before loading the color data of the next cycle. As is demonstrated in FIG. 4, the color data loading pattern is a non linear curve, e.g., an exponential curve, having relatively high slope at the beginning of the loading cycle and lower, though non-zero, slope toward the end of the loading cycle.

The display may load the color data row by row sequentially, for example, from the top row of the display to the bottom row of the display. For example, for LCD displays with refresh rate of 60 Hz, the frame duration may be 1/60 seconds. Since each frame consists of three sub-frames for the three colors, the sub-frame duration may be 1/180 seconds. The time delay between loading the color data of the top row to loading the color data of the bottom row may be, for example, smaller than 1/180 seconds. The back illumination reaches all rows substantially simultaneously. Therefore, there may be a phase shift between loading period of a top row 430 and loading period of a bottom row 420, the phase shift annotated by the dashed diagonal lines, as demonstrated by comparison of the loading times of the two rows depicted in FIG. 4. Each loading period may have a finite rise time until the color data is loaded and a fall time in which the panel is driven back to zero. In order to avoid interfusion between the red, green and blue colors, the LEDs may have to be operated in relatively short pulses 410, and, for example, with high energy in order to provide sufficient illumination within these short pulses. This phase shift may typically be unnoticed by the human eye in a typical single-color operation of a three-color LCD display, because the illumination pulses avoid the range of the color phase shift. However, as described below, the phase shift may become noticeable in some cases, for example, if the colors are operated simultaneously.

Figure 5:
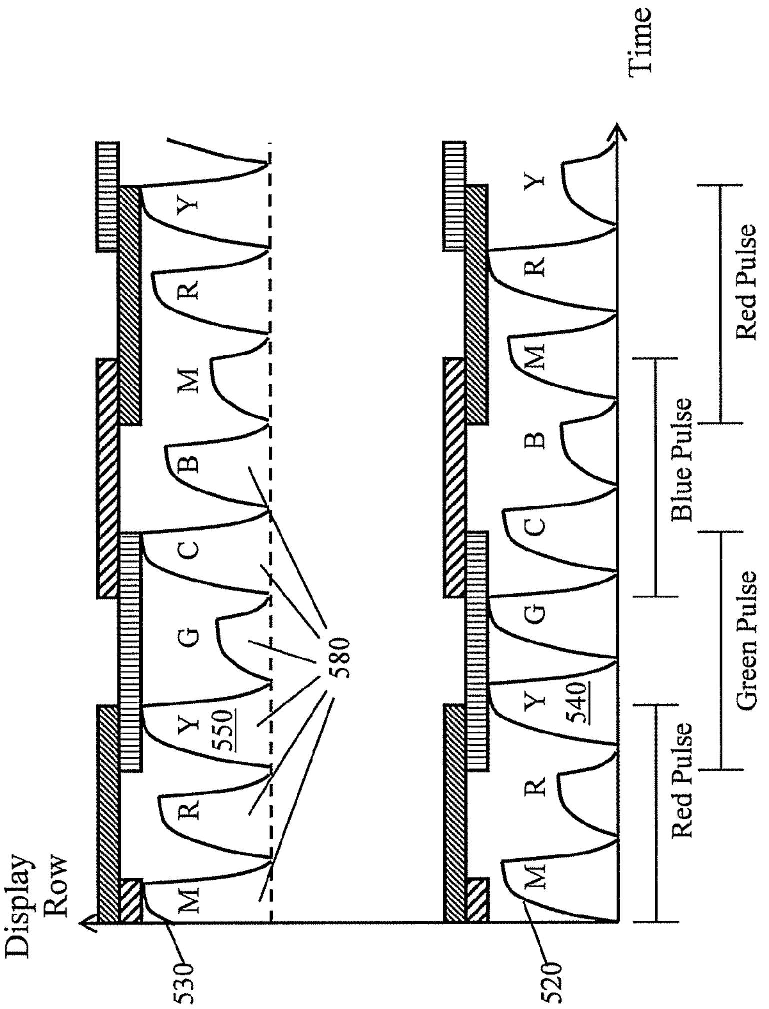
FIG. 5 is a schematic illustration of operation of a multi-color display having six colors, e.g., magenta, red, yellow, green, cyan and blue according to some embodiments of the present invention.

Reference is now made to FIG. 5, which is a schematic illustration of operation of a multi-color display producing six colors using combinations of three LED colors, e.g., magenta, red, yellow, green, cyan and blue, organized as depicted in FIG. 3*b* according to some embodiments of the present invention. The multi-color display of FIG. 5 may sequentially load color display data of the six colors, for example, in color data fields 580. In a multi-color display, a temporal overlap between the green, red, and blue illumination pulses may be required in order to create the additional colors magenta, cyan and yellow, and thus, for example, there may be no need to avoid interfusion between the red, green and blue. Therefore, for example, it may possible to operate the LEDs in significantly broader pulses. The total operation time of each of the LEDs may be, for example, substantially 50% of the frame duration, wherein in the sequential RGB display the operation time of each of the LEDs may be substantially 33% of the frame duration, or lower explained above with reference to FIG. 4. The operation of the LEDs in broader pulses may be more efficient, e.g., may require significantly lower peak power and/or operation of less LEDs in order to provide the same average intensity.

There may be a phase shift between loading period of a top row 530 and loading period of a bottom row 520, for example, because of the row-by-row loading of the data as explained above with reference to FIG. 4. There may be a color shift from top row 530 to bottom row 520, for example, as a result of the phase shift. Thus, for example, during the yellow data pulse 550 of top row 530 the ratio between the red and green illuminations may be greater than during the yellow data pulse 540 of bottom row 520. A procedure for operating the display according to embodiments of the present invention may be activated in order to correct the color shift, which may compensate for variation in the ratio between the different color LEDs illumination, during mixed color data cycle, by changing the ratio between the brightness of the different color LEDs accordingly. For example, the method according to embodiments of the invention may compensate for shortage in duration of illumination of certain color, for example, red illumination during, for example, a yellow data pulse. The compensation may be performed by, for example, increasing the relative transparency (or decreasing the relative opacity) of the LCD in the relevant areas and/or increasing the backlight power and/or increasing the brightness of the red illumination and/or decreasing the brightness of the green illumination where and/or when required.

For example, during the pulse 550 of top row 530 the ratio between red and green illumination may be substantially 1:1, and during the yellow data pulse 540 of bottom row 520 the ratio may be a:1 while a<1. Thus, the light transmitted for an open pixel during the yellow data pulse 550 at line 530 may be:

$$\vec{P}_{550}=D_Y\cdot(\vec{P}_R+\vec{P}_G),$$

where $P_{550}$ is the yellow portion 550 of a pixel having a linearized yellow data value D. $P_R$ and $P_G$ are the color of the red and the green LEDs respectively. In a similar manner, the light transmitted for an open pixel during the yellow data pulse 540 at line 520 may be:

$$\vec{P}_{540}=D_Y(a\vec{P}_R+\vec{P}_G),$$

where $P_{540}$ is the yellow portion 540 of a pixel having a linearized yellow data value $D_Y$. Thus, the difference between the color of pixels having the same yellow value may be:

$$\Delta\vec{P}_{550-540}=(1-a)\cdot D_Y\cdot\vec{P}_R$$

The parameter a may depend on the distance of the current row from the reference row, for example the first row, thus in the general case:

$$\Delta\vec{P}_{mixed}(\#row)=f(\#row)\cdot D_{mixed}\cdot\vec{P}_{preceding\ color}$$

Namely, for each color created by mixture of two LEDs, the difference between the color of pixels having a color data value $D_{mixed}$ between current row and the reference row ($\Delta\vec{P}_{mixed}$) is a multiplication of a function dependent on the row number difference ($f$(#row)), the linearized value of the color data for the relevant pixel ($D_{mixed}$), and the color of the preceding LED ($\vec{P}_{preceding\ color}$). The compensation may therefore be performed, for example, by controlling the ratio of the intensities of the preceding and the following LEDs as a function of row number (assuming that the LEDs are distributed evenly behind the rows and each LED group can be controlled independently), for example by increasing the current to the preceding LED with time so that the preceding LED intensity would increase as the row scan of the mixed field approaches the bottom of the screen, or by decreasing the current to the following LED with time so that the following LED intensity would decrease as the row scan of the mixed field approaches the bottom of the screen. Alternatively, in order to compensate for the reduced preceding color component during the mixed filed, the preceding color intensity of the same pixel may be increased by manipulating the preceding color data ($D_{preceding\ color}$). Thus:

$$\text{NEW } D_{preceding\ color}(\#row)=D_{preceding\ color+f(\#row)}\cdot D_{mixed}$$

For the implementation of this exemplary method, the values of $f$(#row) may be measured and kept in a lookup table. Since the phenomenon may be substantially a result of the LC cell properties, and not necessarily of the color LEDs, the same correction may apply to all mixed colors. During a scan, the values of $f$(#row) may be retrieved from the lookup table based on the row number and multiplied by the linearized mixed data value $D_{mixed}$ to obtain the linearized correction for the preceding color data value of that pixel.

Measuring $f$(#row) may be done, for example, by activating two color LEDs together, thus creating a mixed back illumination color and driving data to the LC cells of the display and simultaneously capturing the screen using a video photometer capable of analyzing the color components and intensities of the colors in different locations of an LCD screen. Alternatively, color data can be measured in several rows, for example, three equally spaced rows, by two calibrated diodes located at each measurement point, each diode capable of measuring one color component. $f$(#row) can than be approximated by linear, or other interpolation. Other suitable measuring techniques may apply. It will be recognized that a number of possible implementations of the method may be used, for example, a processor programmed using machine-readable instructions to perform the method.

Figure 6:
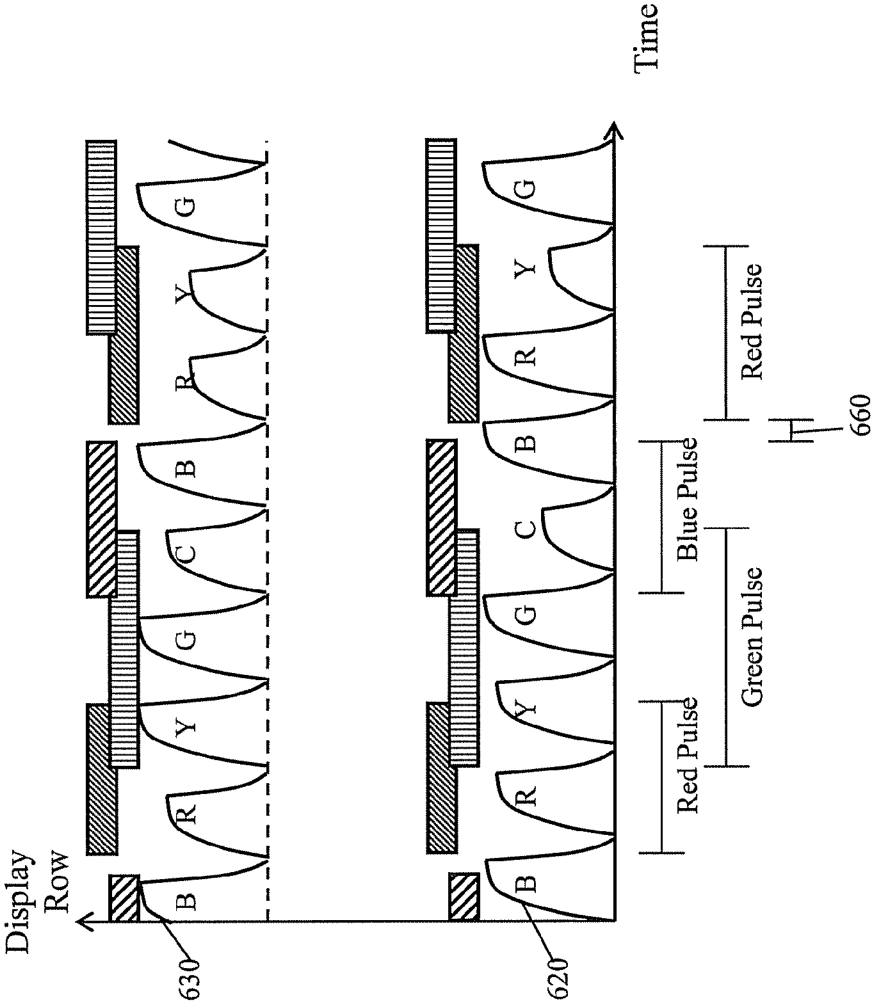
FIG. 6 is a schematic illustration of operation of a multi-color display having five colors according to some embodiments of the present invention.

Other multi-color displays may be obtained by changing the order of the colors or by using any sub-set of colors. For example, FIG. 6 is a schematic illustration of operation of a multi-color display having a total of five colors, e.g., blue, red, yellow, green and cyan, according to some embodiments of the present invention, using red, green and blue color LEDs. In this case, the illumination pulses of the red and blue LEDs may not overlap, because, for example, there may be no magenta color data. Blanking intervals may be inserted between the blue and red illumination pulses, for example, in order to avoid interfusion between the blue and red illumination. For example, interval 660 may be inserted between the blue and red illumination pulses. In this case, the interval is chosen to reduce or minimize color mixing between the red and blue fields, but may cause variations in the luminance of red and blue pixels as a function of row. Any residual color shifts and luminance variations resulting from different color duration ratios may be corrected by a similar algorithm as described above with reference to FIG. 5. For example, a method according to embodiments of the invention may compensate for shortage in duration of illumination of certain color, for example, blue illumination. The compensation may be performed, for example, by increasing the transparency of the LCD in the relevant areas of the display and/or increasing the backlight power and/or increasing the brightness of the blue illumination where and/or when required.

In the common RGB sequential displays LC cells may typically be driven to zero transmittance prior to loading of next color data. This is dune since transition times are typically faster when a cell is driven to zero prior to loading of new data, comparing to moving from one data value to another. This may not waste a substantial amount of back illumination energy in the common RGB sequential displays since the back illumination LEDs may not be activated during the transition between colors, as explained above with reference to FIG. 4.

In the multi-color sequential displays, for example such as in FIG. 3*b*, driving the display to zero transmittance prior to loading of next color data may waste a considerable amount of back illumination energy, since back illumination LEDs may be activated during the transition between colors, as explained above with reference to FIG. 5. Thus, it is possible to drive the LC cell to the required data level directly from the data level of a preceding displayed color.

Figure 7:
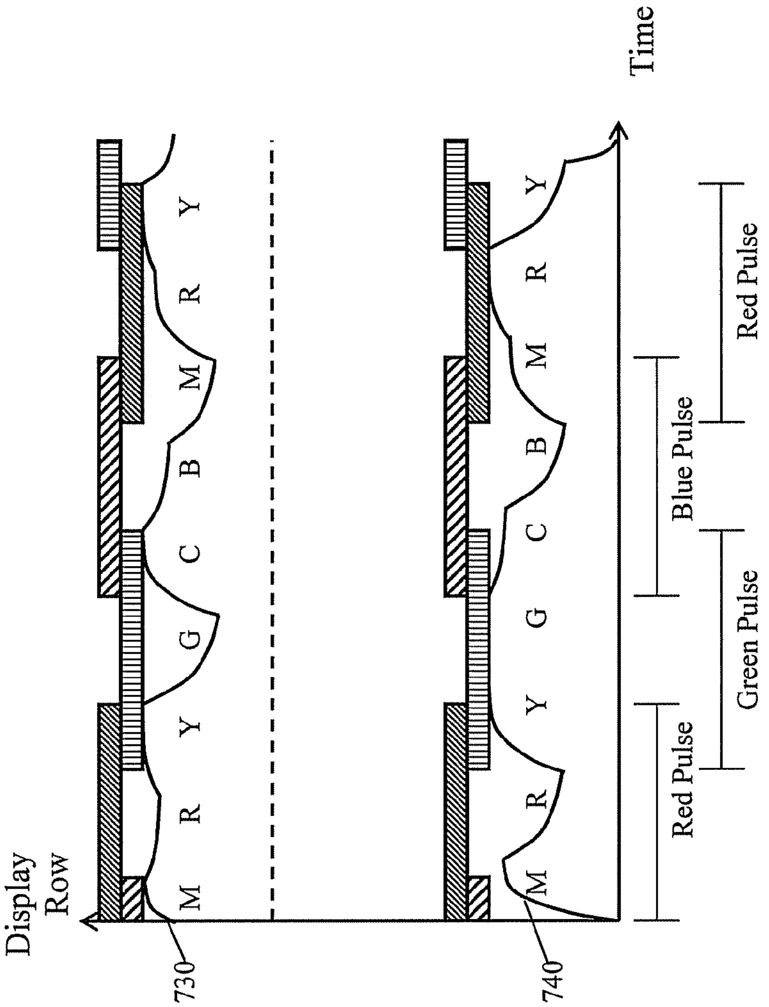
FIG. 7 is a schematic illustration of operation of a multi-color display having six colors according to some embodiments of the present invention.

Reference is now made to FIG. 7 which is a schematic illustration of LC cells transmittance levels of LC cells 730, 740 of a multi-color display having six colors, wherein the LC cells are driven to the required data level directly from the data level of a preceding displayed color.

Figure 8:
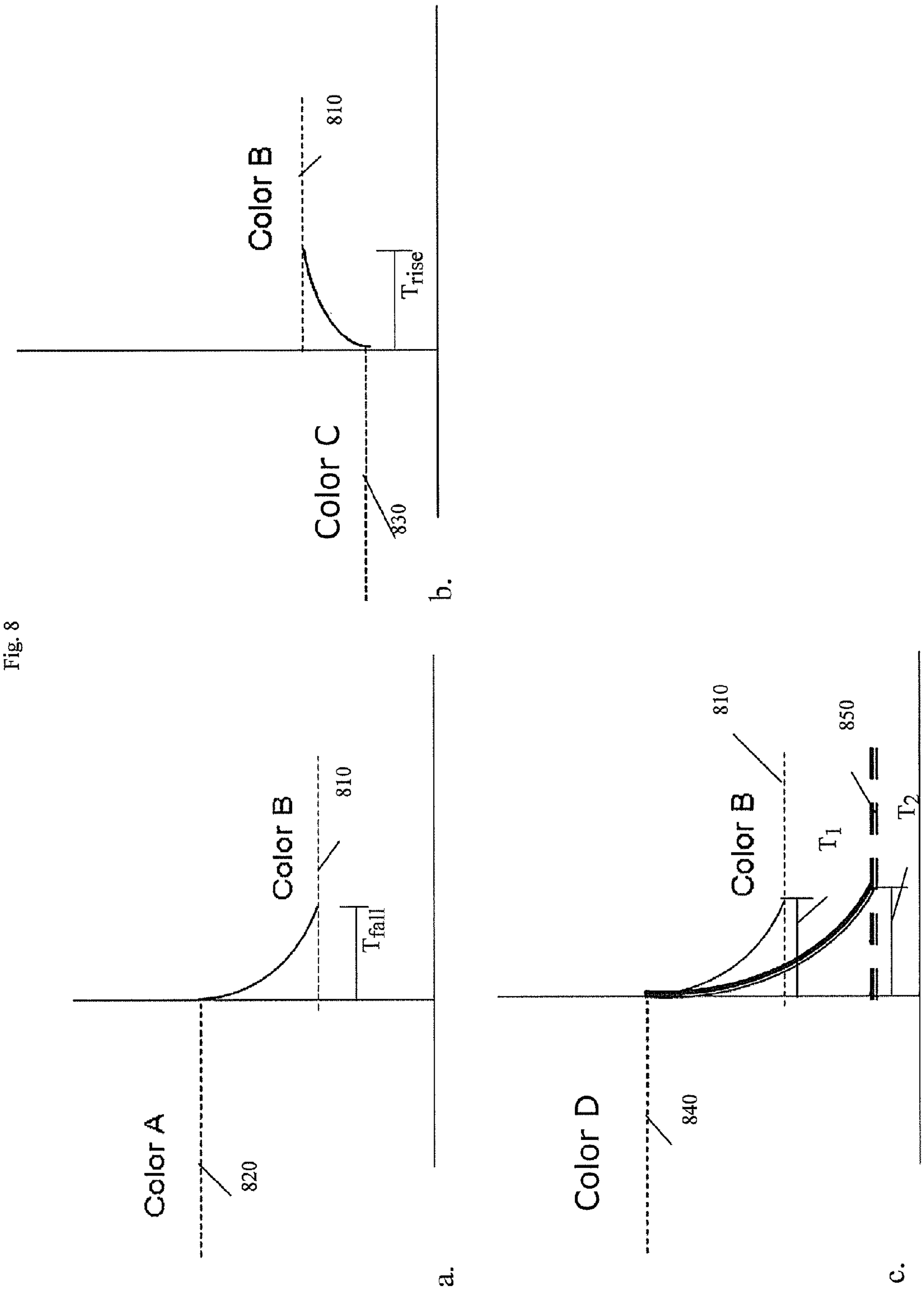
FIGS. 8A and 8B are schematic illustrations of transition from a preceding color intensity to target color intensity according to some embodiments of the present invention.
FIG. 8C is a schematic illustration of an algorithm for color correction according to some embodiments of the present invention.

FIG. 8A is a schematic illustration of transition from color A data level 820 to color B target data level 810 according to some embodiments of the present invention. The data level 820 of color A may be higher than the data level 810 of color B, and the decrease to the transmittance 810 of color B may have a certain fall time Tfall. The average apparent intensity of color B in this case may be higher then the average apparent intensity of color B when rising from zero, for example because during Tfall the transmittance may be higher than color B target data level 810 while during the rise time from zero the transmittance may be lower than color B target data level 810.

FIG. 8B is a schematic illustration of transition from color C data level 830 to color B data level 810 according to some embodiments of the present invention. The data level 830 of color C may be lower than the data level 810 of color B, and the increase to the transmittance 810 of color B may have a certain rise time Trise. The average apparent intensity of color B in this case may be lower then the average apparent intensity of color B in the case of FIG. 8A, for example because during Tfall in the case illustrated in FIG. 8A the transmittance may be higher than color B target data level 810, while during Trise in the case illustrated in FIG. 8B the transmittance may be lower than color B target data level 810. In case the transmittance 830 of color C is higher then zero, the average apparent intensity of color B may be higher then its average apparent intensity when rising from zero.

The dependency of the target color apparent intensity in the data level of the LC cell during of the preceding color may be corrected by an algorithm for color correction. For example, an algorithm may calculate new target data level for color B based on the data level of a preceding color taking into account the increase or decrease time, so that, for example, the average apparent intensity of color B may be the required apparent intensity. For example, FIG. 8C illustrates an operation of an algorithm for color correction according to some embodiments of the present invention. Color D may be the color preceding color B and may be for example, with higher data level 840 then the target data level 810 of color B. The finite decrease time $T_1$ until reaching the target data level 810 of color B may contribute to the average apparent intensity of color B, thus, for example, providing higher average apparent intensity than required. A color correction algorithm may calculate new target data level 850, such that, for example, the average apparent intensity of color B, taking into account the decrease time $T_2$, may be the required apparent average intensity. Alternatively or additionally, the apparent color intensity may be corrected by changing the luminance of the color LED in a similar manner.

According to some embodiments of the invention, new target data levels for color B based on the data level of a preceding color and the data level for color B may be measured and kept in a two-dimensional look-up table. Since the phenomena may be a result of the LCD properties and not of the color LEDs, the same correction may apply to all transition between all colors. During color data loading the values of the preceding and the current color data are used to retrieve the relevant value for the current data level from the look-up table. Alternatively, only sparse sets of values may be stored. During scan the values of the preceding and the current color data may be used to retrieve the closest values from the table and a 2D interpolation within the correction table may be applied to obtain a more accurate correction value. Alternatively, the shape of the 2D correction table can be approximated by other means.

New target data for color B based on the data of a preceding color data level and the desired data level for color B may be measured according to following procedure. First, color B apparent intensity levels for transitions from zero to color B data levels may be measured ($I_{0=>current\ data}$). This may result in function describing the target apparent intensity of color B as a function of color B data value. Next, color B apparent intensity values for transitions from other data levels to the current color B data may be measured ($I_{preceding\ data=>current\ data}$). Since $I_{preceding\ data=>current\ data}$ may differ from $I_{0=>current\ data}$, the measurement is repeated with different data values until the apparent intensity of the new corrected data ($I_{preceding\ data=>corrected\ current\ data}$) equals $I_{0+>current\ data}$. This procedure may be repeated for other combination of preceding data and current data. Color apparent intensity level may be measured by photometer, spectrophotometer, a calibrated diode or any other suitable equipment capable of measuring light intensity. Other procedures for obtaining the 2D correction table may apply.

Figure 9:
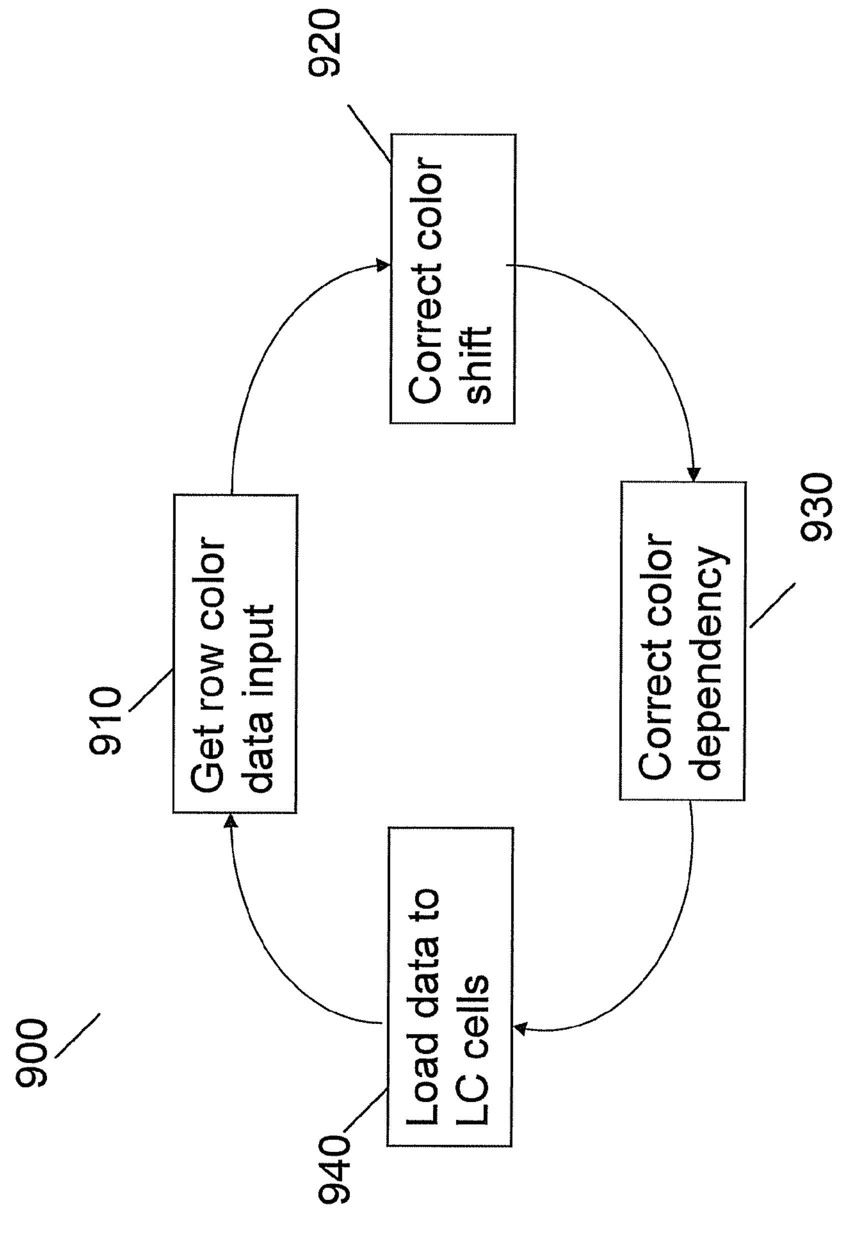
FIG. 9 shows an exemplary schematic flowchart diagram of color data adjustments according to some demonstrative embodiments of the invention.

Reference is now made to FIG. 9 which is an exemplary schematic flowchart illustration of a method 900 which may be preformed by the controller 110 of device 100 according to some demonstrative embodiments of the invention. After receiving row input color data (910), color data is corrected for phase shift based on row number (920), as described above. Another aggregated correction may be preformed for the color dependency phenomenon (930), for example, as described above with reference to FIG. 8. The resultant adjusted color data is than loaded to the LC cells (940), for example by active-matrix addressing, as is known in the art. After loading the color data to the LC cells, the data for the next row of the same color image is received and the process is repeated until the last row of the display, after which the color data of the first row of the next color is loaded and so on. As mentioned above, corrections for the phase shift phenomenon and the color dependency phenomenon may also be preformed by adjusting the LEDs intensity levels.

It should be noted that while in the description hereinabove, the LED colors used are red, green, and blue, LEDs of various other or additional colors corresponding to various wavelengths of light may be used for back illumination, yielding other individual and/or mixed colors. For example, more than three color LEDs, may be utilized in a similar manner.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A liquid crystal display (LCD) device comprising:

an array of liquid crystal (LC) cells, an array of light emitting diodes (LEDs) positioned to back-illuminate said LC array, said array of LEDs comprising LEDs of at least three colors, an illumination control system operably connected to said LED array, said illumination control system being programmed to:

present a sequence of display colors by selectively activating the LED array in a sequence, wherein the number of colors in the sequence is greater than the number of LED colors, and wherein for at least part of the sequence, said illumination control system is to operate LEDs of two different colors simultaneously, with the duration of operation of LEDs of at least one color of said two different colors being substantially longer than one third of the sequence period.

2. The display of claim 1, wherein said illumination control system is programmed to cause said duration to be approximately half of the period.

3. The display of claim 1, wherein the said LED colors include at least red, green and blue.

4. The display of claim 2, wherein said illumination control system is programmed to cause the activation of the green LEDs to follow the activation of the red LEDs, and for at least part of the sequence simultaneous operation of the green LEDs and the red LEDs.

5. The display of claim 2, wherein said illumination control system is programmed to cause the activation of the green LEDs to precede the activation of the red LEDs, and for at least part of the sequence simultaneous activation of the green LEDs and the red LEDs.

6. The display of claim 2, wherein during said sequence, said illumination control system is programmed to cause one continuous operation of said at least one color having duration substantially longer than one third of the sequence period.

7. The display of claim 2, wherein the duration of operation of each of said LEDs is approximately half of the sequence period.

8. The display of claim 2, wherein for another part of the sequence, said illumination control system is to operate said one color alone.

9. The display of claim 8, wherein for yet another part of said duration of operation of LEDs of at least one color of said two different colors, said illumination control system is to operate said one color simultaneously with a third color.

10. The display of claim 2, wherein for the duration of operation of each LED color, said illumination control system is to operate said LED color together with a first other LED color during a first portion of the duration, together with a second other LED color during a second portion of the duration, and alone during a third portion of the duration.

11. The display of claim 10, comprising exactly three LED colors, wherein the number of display colors is six.

12. The display of claim 1, wherein for another part of the sequence, said illumination control system is to operate said one color alone.

13. The display of claim 12, wherein for yet another part of said duration of operation of LEDs of at least one color of said two different colors, said illumination control system is to operate said one color simultaneously with a third color.

14. The display of claim 1, wherein for the duration of operation of each LED color, said illumination control system is to operate said LED color together with a first other LED color during a first portion of the duration, together with a second other LED color during a second portion of the duration, and alone during a third portion of the duration.

15. The display of claim 14, comprising exactly three LED colors, wherein the number of display colors is six.

* * * * *